US012383453B2

(12) United States Patent
Verney

(10) Patent No.: US 12,383,453 B2
(45) Date of Patent: Aug. 12, 2025

(54) EXOSKELETON UPPER LIMB WITH IMPROVED COMPACTNESS

(71) Applicant: COMMISSARIAT A L'ENERGIE ATOMIQUE ET AUX ENERGIES ALTERNATIVES, Paris (FR)

(72) Inventor: Alexandre Verney, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 18/980,919

(22) Filed: Dec. 13, 2024

(65) Prior Publication Data

US 2025/0195314 A1    Jun. 19, 2025

(30) Foreign Application Priority Data

Dec. 14, 2023 (FR) ...................................... 2314211

(51) Int. Cl.
*A61H 1/02* (2006.01)

(52) U.S. Cl.
CPC ... *A61H 1/0285* (2013.01); *A61H 2201/1215* (2013.01); *A61H 2201/149* (2013.01); *A61H 2201/1638* (2013.01); *A61H 2201/1676* (2013.01)

(58) Field of Classification Search
CPC .. A61H 1/0285; A61H 1/0274; A61H 1/0277; A61H 1/0281; A61H 2201/1215; A61H 2201/149; A61H 2201/1638; A61H 2201/1676; B25J 9/0006
See application file for complete search history.

(56) References Cited

U.S. PATENT DOCUMENTS

| 5,067,479 A | 11/1991 | Saringer et al. |
| 5,848,979 A * | 12/1998 | Bonutti ................... A61F 5/013 482/45 |
| 5,951,499 A * | 9/1999 | Saringer ............. A61H 1/0274 601/5 |
| 6,740,051 B2 * | 5/2004 | Hepburn ............. A61H 1/0274 601/40 |

(Continued)

FOREIGN PATENT DOCUMENTS

| CN | 104983546 B | * | 10/2017 | |
| CN | 109394477 A | * | 3/2019 | ........... A61H 1/0285 |

(Continued)

OTHER PUBLICATIONS

English translation for CN 109394477, machine translated by espacenet.com*

(Continued)

*Primary Examiner* — Tu A Vo
(74) *Attorney, Agent, or Firm* — Oblon, McClelland, Maier & Neustadt, L.L.P.

(57) ABSTRACT

An exoskeleton upper limb includes a frame and a connection interface movably mounted relative to the frame to perform a second rotation and a third rotation. The second rotation is actuated by a first kinematic chain of actuation including a first actuator. The third rotation is actuated by a second kinematic chain of actuation including a second actuator. The first kinematic chain includes a first connecting rod and/or the second kinematic chain includes a second connecting rod.

10 Claims, 4 Drawing Sheets

(56) References Cited

U.S. PATENT DOCUMENTS

| | | | |
|---|---|---|---|
| 6,743,187 B2* | 6/2004 | Solomon | A61H 1/0218 |
| | | | 600/595 |
| 7,204,814 B2* | 4/2007 | Peles | A61H 1/0277 |
| | | | 601/5 |
| 2006/0106326 A1* | 5/2006 | Krebs | A61H 1/0274 |
| | | | 601/40 |
| 2010/0016766 A1* | 1/2010 | Zhang | A61H 1/0274 |
| | | | 601/5 |
| 2013/0030327 A1* | 1/2013 | Zhang | A61F 5/0102 |
| | | | 600/587 |
| 2013/0060171 A1* | 3/2013 | Fu | A61H 1/00 |
| | | | 601/5 |
| 2013/0090580 A1 | 4/2013 | Hong et al. | |
| 2015/0359697 A1* | 12/2015 | Celik | A63B 21/0058 |
| | | | 601/33 |
| 2016/0270999 A1* | 9/2016 | Masia | G16H 20/30 |
| 2019/0336382 A1* | 11/2019 | Lan | B25J 9/0006 |
| 2020/0000671 A1* | 1/2020 | Xiong | A61H 1/0274 |

FOREIGN PATENT DOCUMENTS

| | | | | |
|---|---|---|---|---|
| CN | 110897833 | A * | 3/2020 | |
| CN | 114145964 | A * | 3/2022 | |
| CN | 114917108 | A * | 8/2022 | |
| CN | 114917109 | A * | 8/2022 | A61H 1/0285 |
| EP | 2 164 432 | A1 | 3/2010 | |
| KR | 10-2013-0106586 | A | 9/2013 | |

OTHER PUBLICATIONS

French Preliminary Search Report dated Jun. 12, 2024, issued in corresponding application No. FR2314211.

* cited by examiner

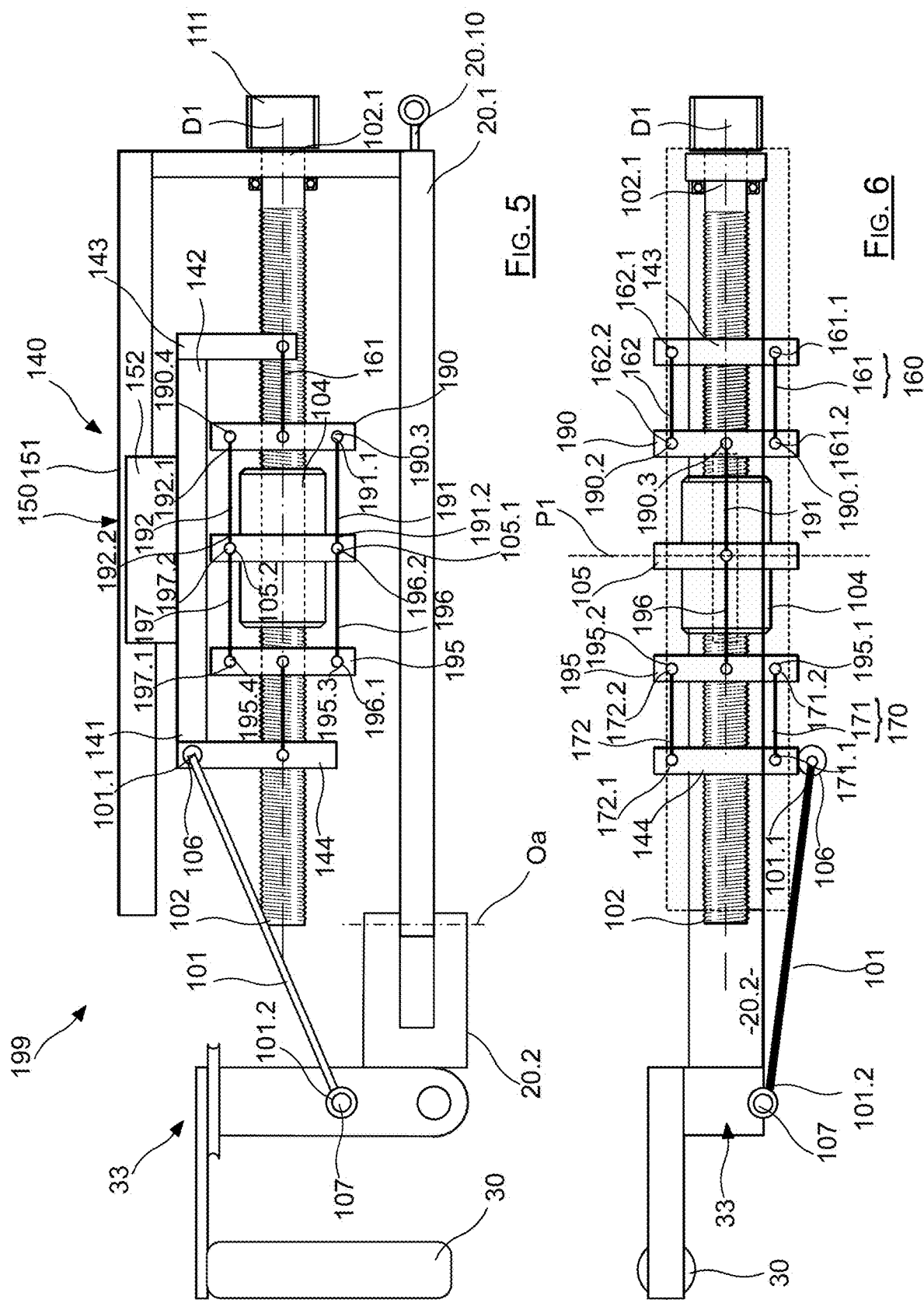

EXOSKELETON UPPER LIMB WITH IMPROVED COMPACTNESS

TECHNICAL FIELD

The invention relates to the field of exoskeletons and more specifically the field of exoskeleton upper limbs and their actuation.

PRIOR ART

Exoskeletons are devices similar to motorised manipulators and are arranged outside a limb of the human body, generally parallel thereto. They can aid a user by supporting all or part of the weight of their limb (rehabilitation exoskeleton) or by providing an additional force (assistance exoskeleton). They can also be used as a motion sensor for the limb, while eliminating the fatigue required to maintain its balance during various tasks such as tele-operations, clinical studies, etc.

An exoskeleton upper limb conventionally comprises an arm segment at the distal end of which a forearm segment is hinged. The proximal end of the arm segment is generally hinged to a shoulder joint connected to the user.

If the hand movements of the user are to be assisted, the forearm segment can comprise a frame designed to accommodate a forearm of the user. The frame comprises a front wrist support and a rear support connected by a structure to enable a first pronosupination rotation of the front support relative to the rear support. A handle to be grasped by a hand of the user is movably mounted relative to the frame to perform rotation about a flexion/extension axis and rotation about an adduction/abduction axis. These rotations are generally powered by electric geared motors, the rotary output of which is integral in rotation with the handle. One of the two geared motors is thus integral with a support which is rotated by the other of the two geared motors. The result is a bulky, heavy forearm segment with very high inertia.

In prior art mechanisms, the lever arm of the actuators produces a great bending moment on the structure of the frame, which causes very high local stresses on the rotational guidance of the front support, resulting in unwanted friction during movements. Such systems therefore have relatively low payloads, large footprints and complex actuation kinematics, which adversely affect user comfort, possible applications for exoskeleton upper limbs, manufacturing costs and control complexity.

OBJECT OF THE INVENTION

The object of the invention is to reduce the inertia and kinematic complexity of an upper limb comprising wrist actuators.

DISCLOSURE OF THE INVENTION

To this end, an exoskeleton upper limb is provided comprising a frame extending along a longitudinal axis and which is intended to receive a forearm of a user, the frame comprising a front wrist support and a rear support connected by a structure to enable a first pronosupination rotation of the front support relative to the rear support about the longitudinal axis. The upper limb also comprises an interface for connection to a hand of the user movably mounted relative to the frame to perform a second rotation about a flexion/extension axis and to perform a third rotation about an adduction/abduction axis. The second rotation is actuated by a first kinematic chain of actuation comprising a first actuator and the third rotation is actuated by a second kinematic chain of actuation comprising a second actuator. According to the invention, the first kinematic chain comprises a first connecting rod, a first rear end of which is hinged to a first output of the first actuator, the first connecting rod comprising a first front end coupled to the connection interface, and/or the second kinematic chain comprises a second connecting rod, a second rear end of which is hinged to a second output of the second actuator and the second connecting rod comprises a second front end coupled to the connection interface.

According to other specific, non-exclusive and optional embodiments of the invention:
- the first front end and/or the first rear end and/or the second front end and/or the second rear end comprise a ball joint;
- the second front end is connected to a transmission linkage which comprises a third transmission rod for transmission about a third axis of rotation and a fourth transmission rod for transmission about a fourth axis of rotation;
- the third axis coincides with the flexion axis;
- the connection interface is rotatably mounted about the adduction axis relative to a structure, the structure itself being rotatably mounted relative to the frame about the flexion axis;
- the first actuator comprises a first screw/nut assembly comprising a first nut cooperating with a first screw extending in a first direction substantially parallel to the longitudinal axis, a first anti-rotation device for blocking a rotation of the first nut relative to the first screw, a first motor designed to rotate the first screw about the first direction and cause linear movement of the first nut; wherein the first rear end is coupled to the first nut;
- the first anti-rotation device comprises a first carriage connected on the one hand to the first nut and on the other hand to the first rear end of the first connecting rod, the first anti-rotation device also comprising a first guiding mechanism for the translation of the first carriage relative to the frame in a direction parallel to the longitudinal axis, and wherein the first carriage is connected to the first nut by a first pair of cables comprising a first cable and a second cable extending on either side of the first screw as well as by a second pair of cables comprising a third cable and a fourth cable extending on either side of the first screw, the first pair of cables and the second pair of cables extending in a direction substantially parallel to the longitudinal axis, the first pair of cables and the second pair of cables being located on either side of a first plane passing through the first nut and which is normal to the first screw;
- the first cable and the second cable are coupled to the first nut by a first intermediate support connected to the first nut by a seventh cable and an eighth cable;
- the third cable and the fourth cable are coupled to the first nut by a second intermediate support connected to the first nut by a ninth cable and a tenth cable;
- the second actuator comprises a second screw/nut assembly comprising a second nut cooperating with a second screw extending in a second direction substantially parallel to the longitudinal axis, a second anti-rotation device for blocking a rotation of the second nut relative to the second screw, a second motor designed to rotate the second screw about the longitudinal axis and cause linear movement of the second nut; wherein the second rear end is coupled to the second nut;

the first and/or the second actuator is a linear output actuator;

the first kinematic chain comprises, successively, a linear output, a connecting rod, a crank mounted to rotate relative to the frame and actuated by the connecting rod.

Further features and advantages of the invention will become apparent on reading the following description of a specific non-limiting embodiment of the invention.

BRIEF DESCRIPTION OF THE DRAWINGS

Reference will be made to the appended figures in which:

FIG. 5 is a schematic view from above of the first kinematic chain shown in FIG. 4;

FIG. 6 is a schematic side view of the first kinematic chain shown in FIG. 5;

DETAILED DISCLOSURE OF PARTICULAR EMBODIMENTS

Figure 1:
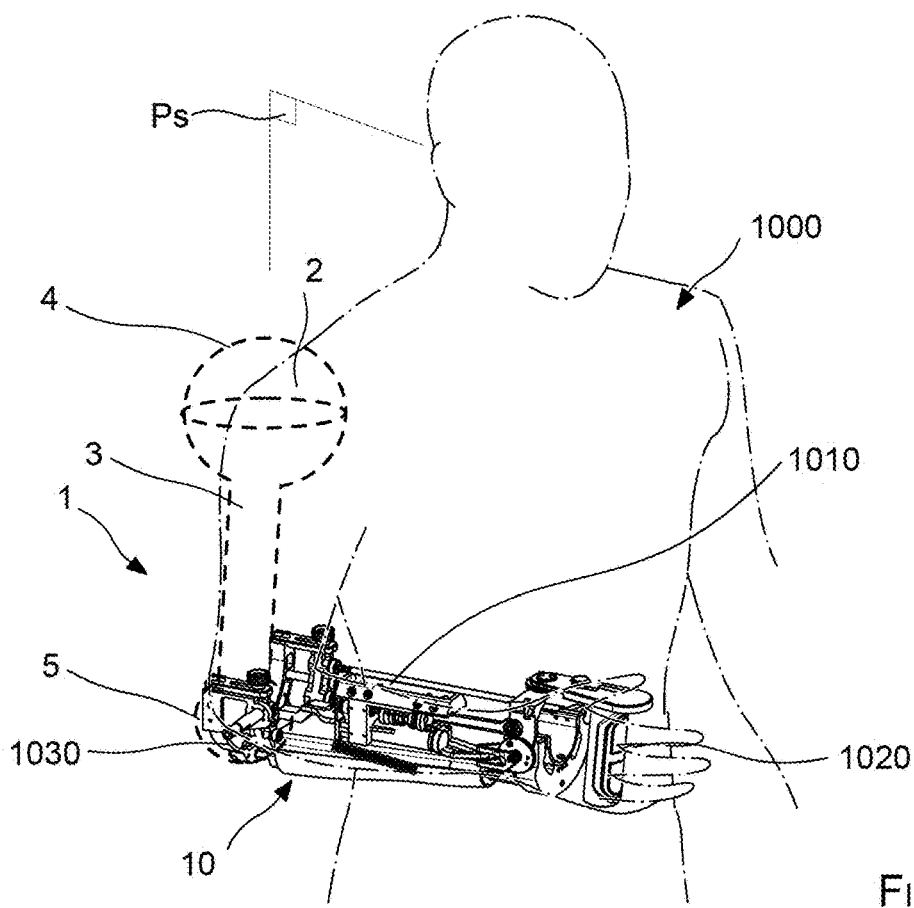
FIG. 1 is a schematic, perspective view of a user wearing an upper limb according to the invention.

With reference to FIG. 1, the upper limb (generally designated by reference numeral 1) is part of an exoskeleton (not shown) provided with a shoulder joint 2 and an arm segment 3. The proximal end 4 of the arm segment 3 is hinged to the shoulder joint 2. A forearm segment 10 is hinged to the distal end 5 of the arm segment 3.

The forearm segment 10 is intended to receive a forearm 1010 of a user 1000. The longitudinal axis of the forearm 1010 therefore substantially coincides with the longitudinal axis Ox of the segment 10. The terms front and rear will be used by analogy with the front and rear of the forearm 1010. In this way, the front will correspond to the end intended to be on the side of the hand 1020 and the rear will correspond to the end intended to be on the side of the elbow 1030 of the user 1000.

Figure 2:
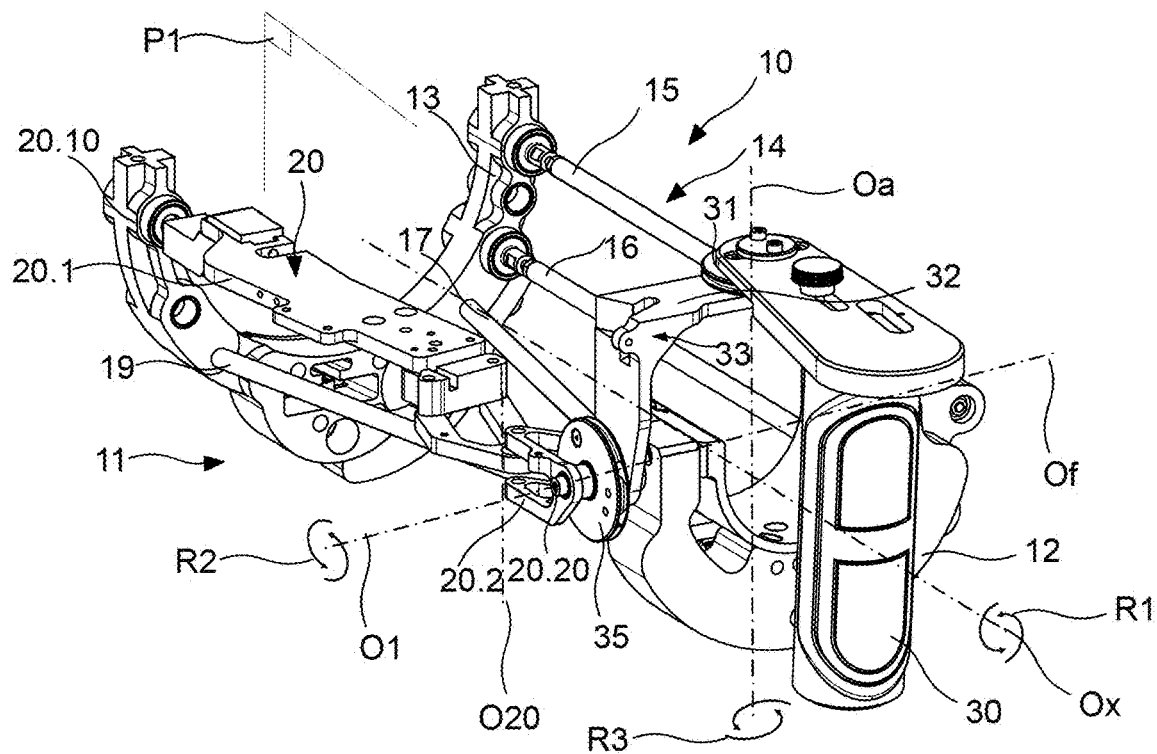
FIG. 2 is a partial schematic, perspective view of the upper limb shown in FIG. 1 as seen from front to back.

The forearm segment 10 shown in FIG. 2 comprises a frame 11 extending along a longitudinal axis Ox. The frame 11 comprises a front support 12 for the wrist 1040 of the user 1000, a rear support 13 and a structure 14 connecting the front 12 and rear 13 supports. The front support 12 has the shape of a half-ring and is movably mounted relative to the rear support 13.

The structure 14 here is in the form of a lattice which comprises five bars 15 to 19 and an aluminium plate 20. As shown in FIG. 2, the structure comprises three inner bars 15, 16 and 17, a middle bar 18 and an outer bar 19, 16, 17, 18 and 19. The bars 15 to 17 lie between a sagittal plane Ps of the user 1000 and a first plane P1 comprising the longitudinal axis Ox and which is parallel to the sagittal plane Ps when the user 1000 is in a rest position, their forearm 1010 along their body: a high inner bar 15, an intermediate inner bar 16 and a low inner bar 17. The middle bar 18 is located in the plane P1. The low outer bar 19 and the plate 20 are located on another side of the plane P1. The rear longitudinal ends of the bars 15 and 16 and of the plate 20 are connected to the support 13 by a ball joint. The rear ends of the bars 17, 18 and 19 are connected to the support 13 by fixed joints—in this case screwed and glued. The bars 17 to 19 thus form a fixed "triangular lattice" type mast which connects the support 12 to the support 13 and absorbs the shear forces applied to the support 12.

The front longitudinal ends of the bars 15 and 16 are also connected to the support 12 by ball joints. The plate 20 is, for its part, connected to the support 13 by a ball joint and to the support 12 by a pivot joint with axis O1 substantially orthogonal to the plane P1.

Figure 3:
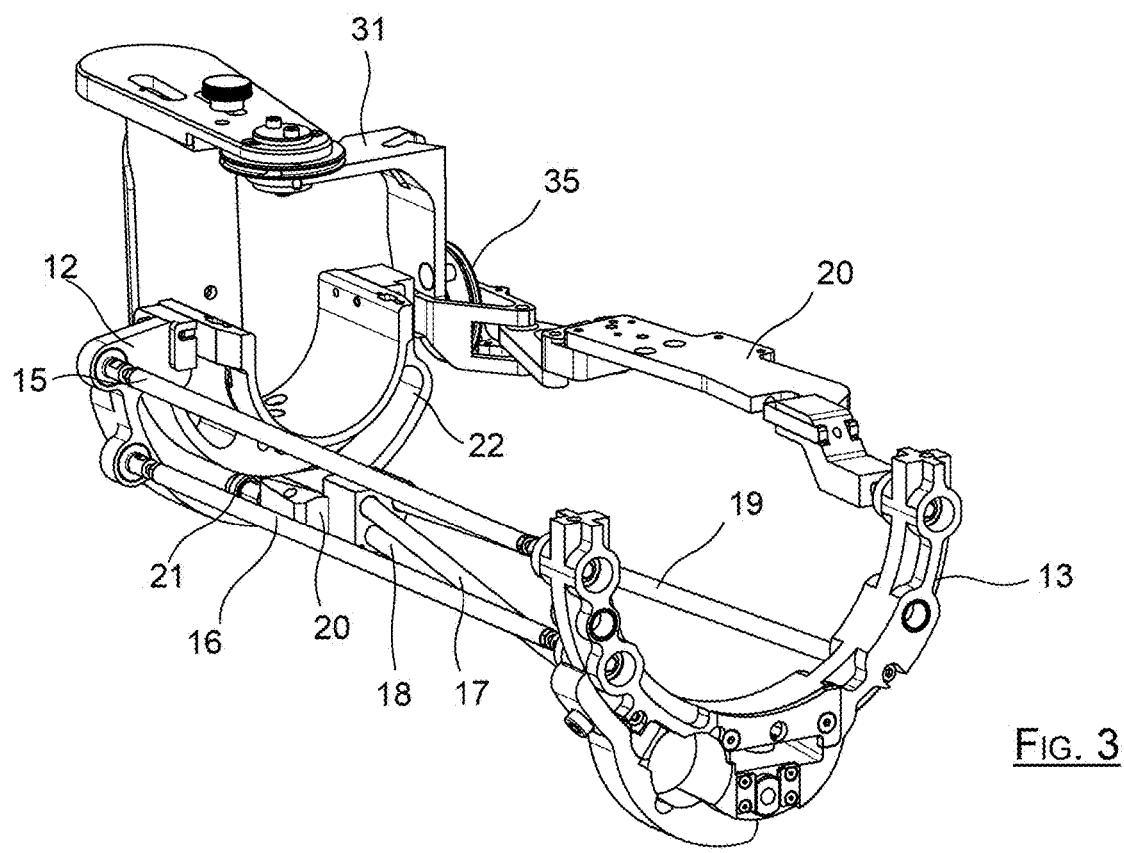
FIG. 3 is an identical view to that shown in FIG. 2 but as seen from back to front.

As shown in FIGS. 2 and 3, the rear support 13 also has the shape of a half-ring, with a larger diameter than that of the front support 12, in order to delimit a frusto-conical inner space approximating the outer contour of the forearm 1010. The forearm segment 10 therefore has substantially the shape of a truncated cone, the bars 15 to 18 of which form generatrices.

The front support 12 is mounted so that it can pivot relative to the rear support 13 about the axis Ox. To do this, the front ends of the bars 17 and 18 are connected to the support 12 via a roller bearing 21 provided with three rollers 22 engaged in a semi-circular groove 23 formed in the support 12. Preferably, one of the rollers 22 is rotatably mounted on an adjustable eccentric shaft to eliminate operating play. This pivoting link can be actuated about the axis Ox in various ways known to a person skilled in the art, such as by motorising the rollers 21.

This link enables a first pronosupination rotation R1 of the front support 12 relative to the rear support 13 about the longitudinal axis Ox.

As shown in FIGS. 2 and 3, a handle 30 is integral with a first pulley 31 mounted so as to rotate about an adduction-abduction axis Oa by means of a bearing (not shown) located at a first end 32 of an L-shaped structure 33. A second end 34 of the structure 33 is mounted so as to rotate relative to the support 12 about a flexion/extension axis Of, which in this case coincides with the axis O1.

The handle 30 can thus perform a second rotation R2 about the flexion/extension axis and a third rotation R3 about the adduction/abduction axis Oa. The second rotation R2 is actuated by a first kinematic chain 100 and the third rotation R3 is actuated by a second kinematic chain 200.

The first kinematic chain 100 comprises a first connecting rod 101 with a first rear end 101.1 and a first front end 101.2.

The second kinematic chain 200 also comprises a second connecting rod 201 with a second rear end 201.1 and a second front end 201.2.

The plate 20 as well as the first kinematic chain 100 and the second kinematic chain 200 will now be described in detail.

The plate 20 comprises a first portion 20.1 and a second portion 20.2 mounted to pivot relative to one another about an axis O20 orthogonal to a plane parallel to the axes Ox and Of. The first portion 20.1 is connected at its rear end 20.10 to the support 13 by a ball joint, and the second portion 20.2 is connected at its end 20.20 by a pivot joint with axis Of to the support 12.

Figure 4:
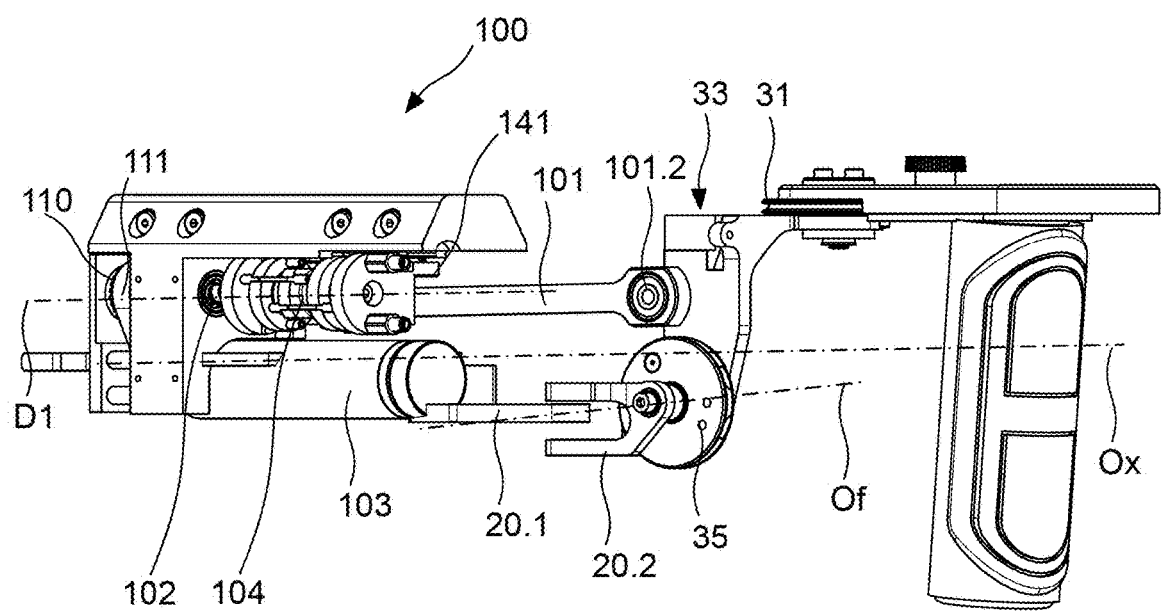
FIG. 4 is a partial schematic, perspective view of the first kinematic chain of the upper limb shown in FIG. 1.

As shown in FIGS. 4 to 6, the first kinematic chain 100 comprises a first screw 102/nut 104 assembly comprising a first nut 104 cooperating with a first screw 102 which extends in a first direction D1 substantially parallel to the longitudinal axis Ox. The first kinematic chain 100 comprises a first anti-rotation device 140 for blocking a rotation of the first nut 104 relative to the first screw 102 and forming a first linear output actuator 199. The anti-rotation device 140 has a carriage 141 mounted for translational movement in a direction parallel to the axis Ox by means of a first guiding mechanism 150. The mechanism 150 is in this case a prismatic linear guide which comprises a rail 151 rigidly attached to the plate 19 and on which a runner 152 attached to the carriage 141 slides.

The carriage 141 comprises a base 142 which extends substantially parallel to the longitudinal axis Ox and at the ends of which project a first arm 143 and a second arm 144 which thus constitute the linear output of the actuator 199. The carriage 141 is connected to the nut 104 by a first pair of cables 160 comprising a first cable 161 and a second cable 162 extending on either side of the screw 102 as well as by a second pair of cables 170 comprising a third cable 171 and a fourth cable 172 extending on either side of the screw 102. As shown in FIG. 6, the first pair of cables 160 and the second pair of cables 170 extend in a direction substantially parallel to the longitudinal axis Ox and the first pair of cables 160 and the second pair of cables 170 are located on either side of a plane passing through the nut 104 and which is normal to the screw 102. More specifically, a third end 161.1 of the cable 161 and a fourth end 162.1 of the cable 162 are crimped onto the arm 143. Symmetrically, a fifth end 171.1 of the cable 171 and a sixth end 172.1 of the cable 172 are crimped onto the arm 144. A seventh end 161.2 of the first cable 161 and an eighth end 162.2 of the second cable 162 are also coupled to the nut 104 by a first intermediate support 190 connected to the nut 104 by a seventh cable 191 and an eighth cable 192. The first intermediate support 190 is in this case in the shape of a ring and comprises a first hole 190.1 into which the seventh end 161.2 of the cable 161 is crimped. The first intermediate support 190 also comprises a second hole 190.2 diametrically opposite the first hole 190.1 and into which the eighth end 162.2 of the cable 162 is crimped.

The first intermediate support 190 also comprises a third hole 190.3 into which a ninth end 191.1 of the seventh cable 191 is crimped and a sixth hole 190.4 into which the tenth end 192.1 of the cable 192 is crimped. The eleventh end 191.2 of the cable 191 is crimped into a seventh hole 105.1 of a ring 105 attached to the nut 104, and the twelfth end 192.2 of the cable 92 is crimped into an eighth hole 105.2 of the ring 105.

In the same way, the thirteenth end 171.2 of the third cable 71 and the fourteenth end 172.2 of the fourth cable 172 are coupled to the nut 104 by a second intermediate support 195 connected to the nut 104 by a ninth cable 196 and a tenth cable 197. The second intermediate support 195 is in this case in the shape of a ring and comprises a seventh hole 195.1 into which the thirteenth end 171.2 of the cable 171 is crimped. The second intermediate support 195 also comprises an eighth hole 195.2 diametrically opposite the seventh hole 195.1 and into which the fourteenth end 172.2 of the cable 172 is crimped.

The second intermediate support 195 also comprises a ninth hole 195.3 into which the fifteenth end 196.1 of the ninth cable 96 is crimped and a tenth hole 195.4 into which the sixteenth end 197.1 of the tenth cable 197 is crimped.

The seventeenth end 196.2 of the cable 196 is crimped into the seventh hole 5.1 and the eighteenth end 197.2 of the tenth cable 197 is crimped into the eighth hole 105.2.

A rear end 102.1 of the screw 102 comprises a gear 110 connected by a belt 111 to a rotary output of a first motor 103.

As shown in FIGS. 4 to 6, the first kinematic chain 100 comprises a first connecting rod 101, a first rear end 101.1 of which is hinged to the arm 144 of the carriage 141 by means of a ball joint 106. The first front end 101.2 of the first connecting rod 101 is connected to the structure 33, which acts as the crank and on which the handle 30 is mounted by means of a ball joint 107.

Thus, the first kinematic chain 100 comprises, successively, a linear output 144 of an actuator 199, a connecting rod 101, a crank 33 mounted to rotate relative to the frame 11 and actuated by the connecting rod 101.

In this way, rotation of the output of the motor 103 rotates the screw 102 and causes linear movement of the first nut 104. This linear movement is transmitted to the carriage 141 and therefore moves the first rear end 101.1 of the connecting rod 101 relative to the plate 20—and incidentally to the frame 11—which therefore rotates the handle 30 about the flexion axis Of via a connecting rod 101-crank 30 connection. In this way, the motor 103 actuates the second rotation R2 via a linear output 144 of an actuator 199.

Figure 7:
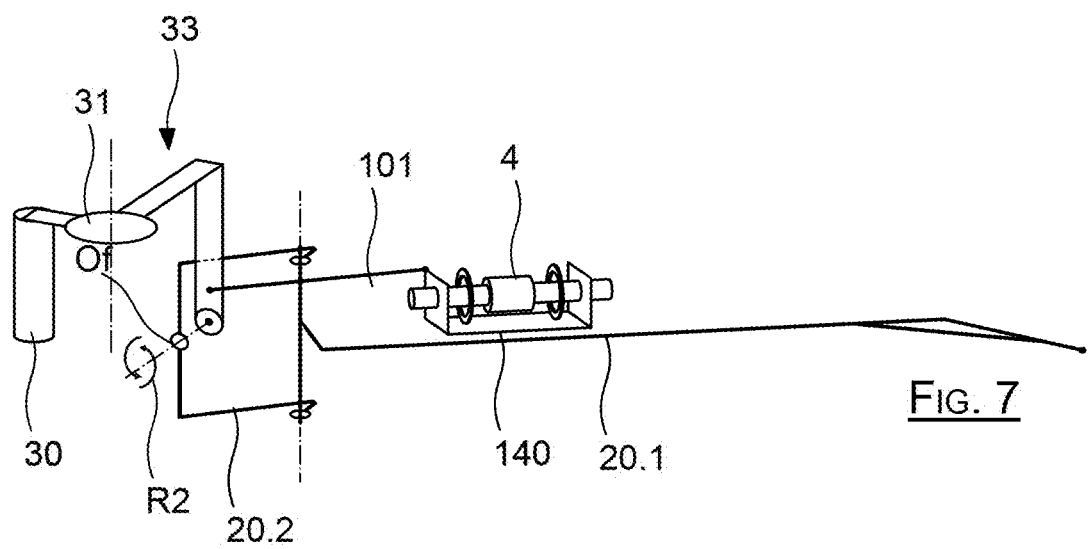
FIG. 7 is a kinematic view of the first kinematic chain shown in FIG. 5.

The kinematic chain 100 and its main elements are kinematically represented in FIG. 7.

Figure 8:
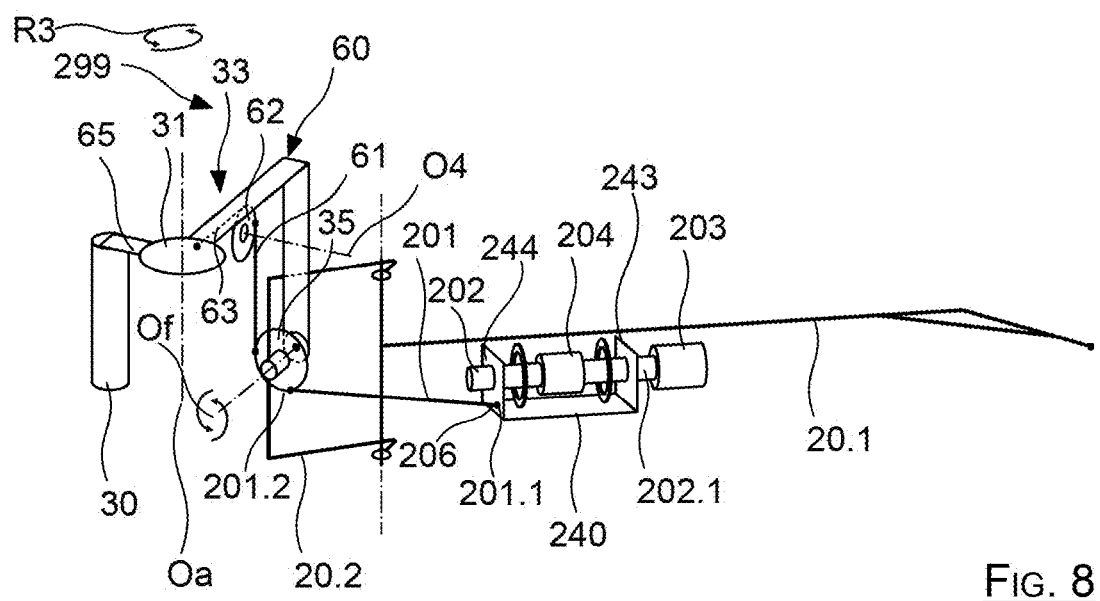
FIG. 8 is a kinematic view of the second kinematic chain of the upper limb shown in FIG. 1.

The second kinematic chain 200, represented in FIG. 8 according to the same representation as that in FIG. 7, comprises a second screw 202/nut 204 assembly comprising a second nut 204 cooperating with a second screw 202 extending in a second direction D2 substantially parallel to the longitudinal axis Ox. The second kinematic chain 200 comprises a second anti-rotation device 240 for blocking a rotation of the second nut 204 relative to the second screw 202, identical to the first anti-rotation device 140, and forming a second linear output actuator 299. The second anti-rotation device 240 comprises a carriage 241 provided with two arms 243 and 244 and which is mounted for translational movement in a direction parallel to the axis Ox by means of a second guiding mechanism (not shown). A rear end 202.1 of the screw 202 is connected to a rotary output of a second motor 203. The second arm 244 thus constitutes the linear output of the actuator 299.

As shown in FIGS. 8, the second kinematic chain 200 comprises a second connecting rod 201, a second rear end 201.1 of which is hinged to the arm 244 of the carriage 241 by means of a ball joint 206. The first front end 201.2 of the second connecting rod 201 is connected to a second pulley 35 hinged about the axis Of and shown in FIGS. 2 to 6 and 8. The pulley 35 is connected to a transmission linkage 60. The linkage 60 comprises a third transmission rod 61 for transmission about the axis Of, which extends between the pulley 35 and a third transmission pulley 62 pivotally mounted on the structure 33 about a fourth axis of rotation O4 substantially orthogonal to a plane parallel to the axes Oa and Of. A fourth connecting rod 63 connects the pulley 62 and the pulley 31 to actuate the third rotation R3 of the handle 30 about the axis Oa. The handle 30 is connected to the pulley 31 by a connecting rod 65 integral in rotation with the pulley 31. The assembly formed by the pulley 31 and the connecting rod 65 forms a crank actuated by the connecting rod 63.

In this way, rotation of the output of the motor 203 rotates the screw 202 and causes linear movement of the nut 204. This linear movement is transmitted to the carriage 241 and therefore moves the second rear end 201.1 of the connecting rod 201 relative to the plate 19—and incidentally relative to the frame 11—which therefore rotates the handle 30 about the abduction axis Oa. In this way, the motor 203 actuates the third rotation R3.

Thus, the second kinematic chain 200 comprises a linear output 244 of an actuator 299, a connecting rod 63, a crank 65 mounted to rotate relative to the frame 11 and actuated by the connecting rod 62.

This results in an upper lib, the forearm actuators of which are more compact and less complex than those in the prior art. The number of parts is also reduced which confers a significant advantage in terms of reliability and production costs. Finally, no actuator is subject to the inertia of the other actuator (weight of the motor and motion transformation elements) which also improves the footprint, weight, energy consumption and manufacturing cost of the upper limb 1.

Of course, the invention is not limited to the embodiments described but encompasses any alternative embodiment falling within the scope of the invention as defined by the claims. In particular,

- although in this case the first kinematic chain and the second kinematic chain both comprise a connecting rod, one rear end of which is coupled to an output of the actuator and one front end of which is coupled to the connection interface, the invention is also applicable to only one of the two kinematic chains being fitted with such a connecting rod, the other chain being able to be actuated according to actuating methods known to a person skilled in the art such as geared motors or cable actuators with idler pulleys;
- although in this case the bares are connected to the front and rear supports by ball joints, the invention is also applicable to other types of spherical joints, e.g. a joint providing three rotations about three orthogonal axes, such as a universal joint associated with a pivot joint converging at the centre of the universal joint, or a ball joint associated with a pivot joint, or any other equivalent joint or combination of joints;
- although in this case the two ends of the bars are connected to the supports by ball joints, the invention is also applicable to other types of connection of the bars to the supports, such as bars having ball joints at the ends connected to the same support, and cardan joints at their other ends. The joints are advantageously uniform on each support. Alternatively, the links between the bars and the supports could be made directly by elastic joints;
- although in this case the limb comprises a handle, the invention is also applicable to other types of interface for connection to a hand of a user such as a glove or a strap;
- although in this case the first kinematic chain comprises a screw/nut assembly actuated by a motor and connected to an anti-rotation device for forming a linear output actuator, the invention is also applicable to other types of linear output actuators, for example a linear actuator such as a hydraulic, pneumatic or electric actuator, or even a rack and pinion assembly;
- although in this case the first rear end of the first connecting rod is hinged to an arm of the carriage, the invention is also applicable to a first rear end hinged to other types of output of the actuator of the second rotation, such as the base of the carriage or to the nut.

The invention claimed is:

1. An exoskeleton upper limb comprising:
   a frame extending along a longitudinal axis and the frame is configured to receive a forearm of a user, the frame comprising a front wrist support and a rear support connected by a structure to enable a first pronosupination rotation of the front wrist support relative to the rear support about the longitudinal axis; and
   a connection interface configured to connect to a hand of the user, the connection interface being movably mounted relative to the frame to perform a second rotation about a flexion-extension axis and to perform a third rotation about an adduction-abduction axis, the second rotation being actuated by a first kinematic chain of actuation comprising a first actuator, and the third rotation being actuated by a second kinematic chain of actuation comprising a second actuator, wherein
   the first kinematic chain comprises a first connecting rod, a first rear end of the first connecting rod is hinged to a first output of the first actuator, the first connecting rod comprising a first front end coupled to the connection interface, and/or
   the second kinematic chain comprises a second connecting rod, a second rear end of the second connecting rod is hinged to a second output of the second actuator and the second connecting rod comprises a second front end coupled to the connection interface.

2. The upper limb according to claim 1, wherein at least one of the first rear end, the first front end, the second rear end, and the second front end comprise a ball joint.

3. The upper limb according to claim 1, wherein the second front end is connected to a transmission linkage, the transmission linkage comprises a third transmission rod for transmission about a third axis of rotation and a fourth transmission rod for transmission about a fourth axis of rotation.

4. The upper limb according to claim 3, wherein the third axis coincides with the flexion-extension axis.

5. The upper limb according to claim 1, wherein the connection interface is rotatably mounted about the adduction-abduction axis relative to a second structure, the second structure being rotatably mounted relative to the frame about the flexion-extension axis.

6. The upper limb according to claim 1, wherein the first actuator comprises
   a first screw and nut assembly comprising a first nut cooperating with a first screw extending in a first direction substantially parallel to the longitudinal axis;
   a first anti-rotation device to block a rotation of the first nut relative to the first screw; and
   a first motor configured to rotate the first screw about the first direction and cause linear movement of the first nut, wherein
   the first rear end is coupled to the first nut.

7. The upper limb according to claim 6, wherein the first anti-rotation device comprises a first carriage connected to the first nut and to the first rear end of the first connecting rod, the first anti-rotation device also comprising a first guiding mechanism for a translation of the first carriage relative to the frame in a direction parallel to the longitudinal axis, and wherein the first carriage is connected to the first nut by a first pair of cables comprising a first cable and a second cable extending on either side of the first screw as well as by a second pair of cables comprising a third cable and a fourth cable extending on either side of the first screw, the first pair of cables and the second pair of cables extending in a direction substantially parallel to the longitudinal axis, the first pair of cables and the second pair of cables being located on either side of a plane passing through the first nut and and the plane is normal to the first screw.

8. The upper limb according to claim 7, wherein the first cable and the second cable are coupled to the first nut by a first intermediate support connected to the first nut by a seventh cable and an eighth cable.

9. The upper limb according to claim 7, wherein the third cable and the fourth cable are coupled to the first nut by a second intermediate support connected to the first nut by a ninth cable and a tenth cable.

10. The upper limb according to claim 6, wherein the second actuator comprises
- a second screw and nut assembly comprising a second nut cooperating with a second screw extending in a second direction substantially parallel to the longitudinal axis;
- a second anti-rotation device to block a rotation of the second nut relative to the second screw; and
- a second motor configured to rotate the second screw about the longitudinal axis and cause linear movement of the second nut, wherein the second rear end is coupled to the second nut.

* * * * *